(12) United States Patent
Chen

(10) Patent No.: US 7,643,321 B2
(45) Date of Patent: Jan. 5, 2010

(54) BI-DIRECTIONAL CURRENT SENSING CIRCUIT

(75) Inventor: Keming Chen, Torrance, CA (US)

(73) Assignee: GM Global Technology Operations, Inc., Detroit, MI (US)

( * ) Notice: Subject to any disclaimer, the term of this patent is extended or adjusted under 35 U.S.C. 154(b) by 531 days.

(21) Appl. No.: 11/236,858

(22) Filed: Sep. 27, 2005

(65) Prior Publication Data

US 2007/0070664 A1 Mar. 29, 2007

(51) Int. Cl.
*H02M 3/24* (2006.01)
*H02M 7/44* (2006.01)
*H02M 5/42* (2006.01)

(52) U.S. Cl. .......................................... 363/95; 363/98

(58) Field of Classification Search .................. 363/95, 363/98, 17, 132, 133
See application file for complete search history.

(56) References Cited

U.S. PATENT DOCUMENTS

| | | | | |
|---|---|---|---|---|
| 5,164,890 A | * | 11/1992 | Nakagawa et al. | 363/65 |
| 5,198,969 A | * | 3/1993 | Redl et al. | 363/17 |
| 5,315,498 A | * | 5/1994 | Berrios et al. | 363/98 |
| 6,229,725 B1 | * | 5/2001 | Nielsen | 363/132 |
| 2003/0048648 A1 | * | 3/2003 | Lin et al. | 363/65 |

* cited by examiner

*Primary Examiner*—Bao Q. Vu
*Assistant Examiner*—Jue Zhang

(57) ABSTRACT

A current sensing circuit that determines an output current of a bi-directional converter circuit comprises a current transformer that receives a first current signal and that outputs a second current signal. The first current signal is indicative of the output current and flows in one of a first direction and/or a second direction. The second current signal is indicative of the first current signal. A current sensing module receives the second current signal and has a first state and a second state. A converter control module simultaneously transitions the first current signal from the first direction to the second direction and transitions the current sensing module from the first state to the second state. The converter control module transitions the current sensing module to the first state after a resetting period.

18 Claims, 7 Drawing Sheets

BI-DIRECTIONAL CURRENT SENSING CIRCUIT

FIELD OF THE INVENTION

The present invention relates to bi-directional converter circuits, and more particularly to sensing output current of bi-directional converter circuits.

BACKGROUND OF THE INVENTION

DC/DC converter circuits are used to receive an input DC voltage and output an output DC voltage. Typically, the output DC voltage is different than the input DC voltage. For example, a DC/DC converter circuit may act as a step-down DC/DC converter that outputs an output DC voltage that is less than the input DC voltage. The DC/DC converter circuit may act as a step-up DC/DC converter that outputs an output DC voltage that is greater than the input DC voltage. DC/DC converter circuits may also be used for other purposes, such as to provide noise isolation or regulate voltage levels.

Referring now to FIG. 1, an exemplary DC/DC converter circuit 10 includes a converter circuit 12 and a converter control module 14. The converter circuit 12 receives an input voltage 16. The converter control module 14 generates one or more switching control signals 18. The converter circuit 12 generates output voltage signals 20 according to the input voltage 16 and the switching control signals 18. In a bi-directional DC/DC converter circuit, current flows out of the converter circuit 12 in first and second directions. Current may flow in a first direction in a first operating mode and in a second direction in a second operating mode. In this manner, an AC output of the converter circuit 12 is bi-directional.

It may be desirable to sense an output current through a load or another portion of the DC/DC converter circuit 10 to perform various adjustments of the DC/DC converter circuit 10. The DC/DC converter circuit 10 may be adjusted when the output current exceeds a predetermined threshold and/or when the output current is not equivalent to a desired output current. A current sensing device (not shown) may be used to sense the output current. For example, the current sensing device may sense a voltage drop across a sense resistor 22 to determine the output current.

A DC/DC converter circuit 24 may include a current sensing device 26 that further includes a current transformer 28 as shown in FIG. 2. The DC/DC converter circuit 24 includes a converter circuit 12 that receives an input voltage 16 and generates output voltage signals 20 as previously described with respect to FIG. 1. A converter control module 14 generates one or more switching control signals 18.

The current sensing device 26 communicates with the DC/DC converter circuit 24 to determine an output current (i.e. a current through a load connected to output voltage signals 20) of the DC/DC converter circuit 24. The current sensing device 26 receives a current signal 30 that is indicative of current through one or more components of the DC/DC converter circuit 24. The bi-directional current signal 30 is further indicative of the output current of the DC/DC converter circuit 24.

The current signal 30 flows through the current transformer 28. The current transformer 28 generates a second current signal 32 according to the current signal 30. A rectifier diode 34 receives the second current signal 32 and generates a rectified sensing current signal 36 accordingly. The sensing current signal 36 flows through a resistor 38. In this manner, a value of the sensing current signal 36 can be determined according to a voltage at a voltage sensing node 40.

Typically, current transformers (i.e. current sense transformers) are used to measure current trends, peak values, and average values for purposes of current limiting and/or control. As described in FIG. 2, the current sensing device 26 comprising the current transformer 28 forms a feedback loop that provides current information to the converter control module 14 for use in pulse width modulation (PWM) control. Current transformers provide voltage isolation between the sensed current and the output current and improve the overall efficiency of the DC/DC converter circuit. Current transformers are often preferred over other methods such as described in FIG. 1.

As shown in FIG. 2, the current transformer 28 includes a primary winding 42 and a secondary winding 44. Typically, current transformers use a single turn primary winding to minimize power loss and increase a signal to noise ratio. During operation, the current sensing device 26 senses current as described above when the current signal 30 is flowing in a first direction. A transformer core 46 acquires magnetizing energy as a result of the current flow. When the direction of the current signal 30 reverses according to operation of the converter circuit 12, current flowing through the primary winding 42 reverses. However, the magnetizing energy stored in the transformer core 46, as well as magnetizing inductance characteristics of the secondary winding 44, prevents the secondary winding 44 from providing an accurate indication of the current signal 30.

As a result, typical current sensing devices require the current transformer 28 (i.e. the stored magnetizing energy) to be reset. For example, the current sensing device 26 may include a resetting diode 48 that blocks current flow through the secondary winding 44 when the current signal 30 is flowing in a second direction. In this manner, the current transformer 28 resets during a reset period following transitions of the bi-directional current signal 30 from the first direction to the second direction. As such, the current sensing device 26 is not able to provide current sensing during reset periods.

SUMMARY OF THE INVENTION

A current sensing circuit that determines an output current of a bi-directional converter circuit comprises a current transformer that receives a first current signal and that outputs a second current signal. The first current signal is indicative of the output current and flows in one of a first direction and/or a second direction. The second current signal is indicative of the first current signal. A current sensing module receives the second current signal and has a first state and a second state. A converter control module simultaneously transitions the first current signal from the first direction to the second direction and transitions the current sensing module from the first state to the second state. The converter control module transitions the current sensing module to the first state after a resetting period.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 4 is a circuit schematic of a bi-directional converter current sensing circuit according to the present invention that illustrates a converter circuit in more detail;

DETAILED DESCRIPTION OF THE PREFERRED EMBODIMENTS

Figure 1:
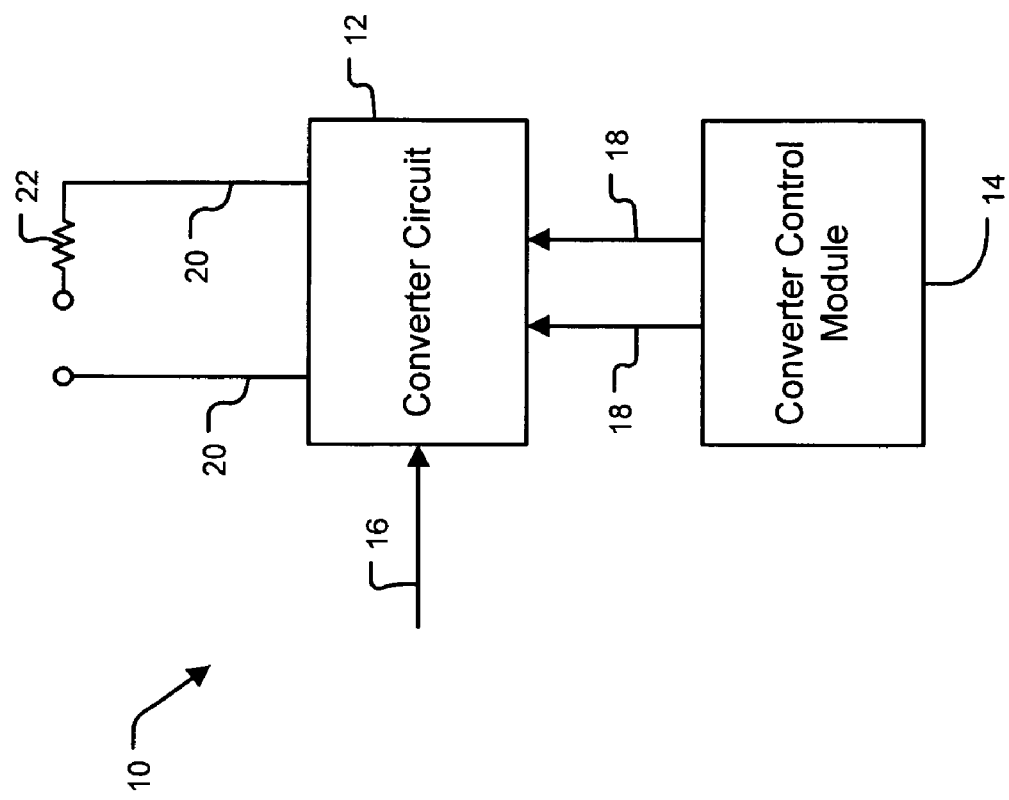
FIG. 1 is a functional block diagram of an exemplary DC/DC converter circuit according to the prior art.
Figure 2:
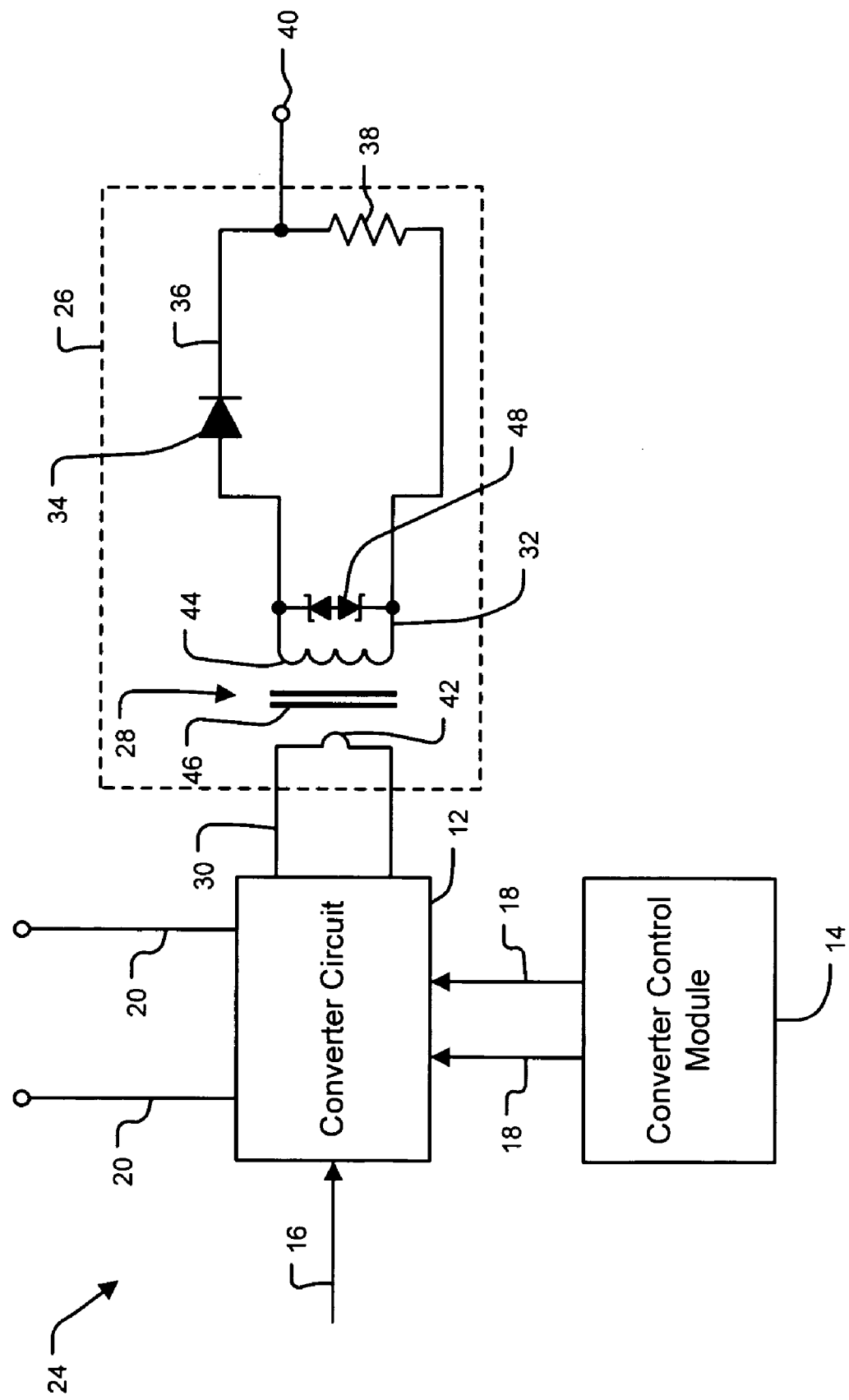
FIG. 2 is a functional block diagram of a bi-directional converter that sense current with a current transformer according to the prior art.

The following description of the preferred embodiment(s) is merely exemplary in nature and is in no way intended to limit the invention, its application, or uses. For purposes of clarity, the same reference numbers will be used in the drawings to identify similar elements. As used herein, the term module and/or device refers to an application specific integrated circuit (ASIC), an electronic circuit, a processor (shared, dedicated, or group) and memory that execute one or more software or firmware programs, a combinational logic circuit, and/or other suitable components that provide the described functionality.

Figure 3:
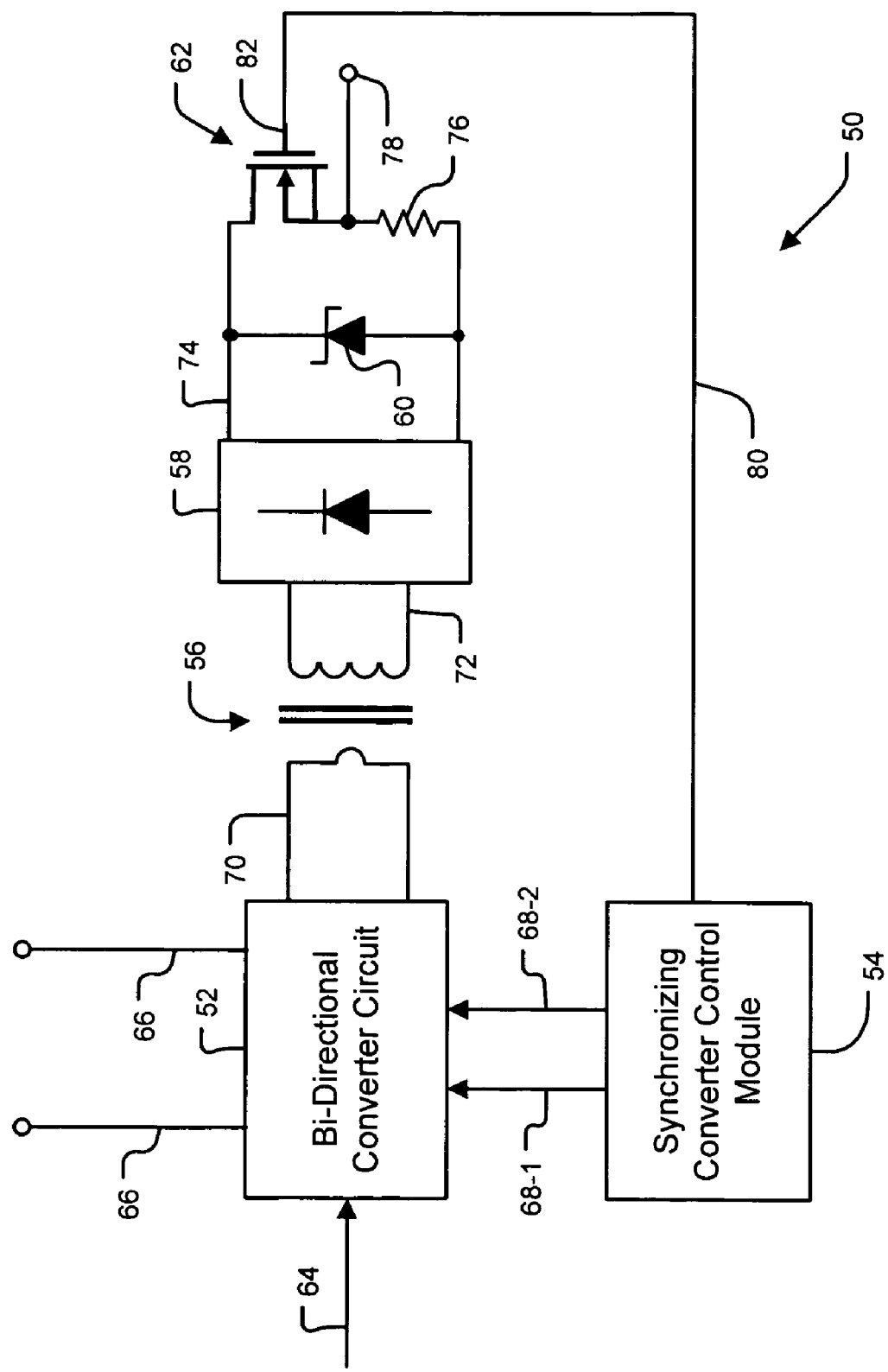
FIG. 3 is a functional block diagram of a bi-directional current sensing circuit according to the present invention.

Referring now to FIG. 3, a bi-directional current sensing circuit 50 according to a first implementation of the present invention senses a bi-directional current output of a bi-directional converter circuit 52. The current sensing circuit 50 includes a synchronizing converter control module 54, a current transformer 56, a rectifier module 58, a resetting zener diode 60, and a resetting transistor 62. The converter circuit 52 receives an input voltage 64 as described above with respect to FIG. 1. The converter circuit 52 generates output voltage signals 66 according to the input voltage 64 and switching control signals 68-1 and 68-2, referred to collectively as switching control signals 68.

The current sensing circuit 50 receives a bi-directional current signal 70 from the converter circuit 52 as described above. The input voltage 64, as well as characteristics of the converter circuit 52 and the converter control module 54, determine a direction (i.e. polarity) and magnitude of the bi-directional current signal 70. The switching control signals 68 control switching behavior of one or more semiconductor switches (e.g. transistors) included in the converter circuit 52. The switching behavior of the semiconductor switches affects the direction and magnitude of the current 70.

The current transformer 56 receives the bi-directional current signal 70 and generates a second bi-directional current signal 72 as described above. The rectifier module 58 rectifies the second bi-directional current signal 72 and outputs a sensing current signal 74. The rectifier module 58 is any suitable rectifier circuit as is known in the art. When the bi-directional current signal 70 (as well as the second bi-directional signal 72) is to be sensed, the resetting transistor 62 is ON. The sensing current signal 74 is permitted to flow through a sensing resistor 76. A voltage measured at a voltage sensing node 78 is indicative of a current through the sensing resistor 76, and is further indicative of the bi-directional current signal 70. The resetting transistor 62 is turned OFF to allow the current transformer 56 to reset. In this manner, the current sensing circuit 50 senses an output current (or other desired current) of the converter circuit 52.

The converter control module 54 operates according to a PWM control method to generate the switching control signals 68. Those skilled in the art can appreciate that any suitable PWM control method can be used. The converter control module 54 controls the converter circuit 52 in a manner that transitions the bi-directional current signal 70 from the first direction to a second direction. According to features of the present implementation, the converter control module 54 generates a resetting signal 80. The resetting signal 80 is output to a gate node 82 of the resetting transistor 62. The converter control module 54 turns the resetting transistor 62 ON and OFF with the resetting signal 80. As described above, the converter control module 54 turns the resetting transistor 62 ON when the bi-directional current signal 70 is to be sensed.

When the converter control module 54 operates the converter circuit 52 to transition the bi-directional current signal 70 from the first direction to the second direction, the converter control module 54 simultaneously turns the resetting transistor 62 OFF. In other words, the converter control module 54 synchronizes the ON and OFF status of the resetting transistor 62 with the current direction transitions of the bi-directional current signal 70.

When the resetting transistor 62 is OFF, current is not permitted to flow through the sensing resistor 76. The resetting zener diode 60 allows the current transformer 56 to reset when the resetting transistor 62 is OFF. When the current transformer 56 is reset, the converter control module 54 turns the resetting transistor 62 ON, allowing current to continue to flow through the sensing resistor 76. The resetting transistor 62 is OFF for a resetting period that allows the current transformer 56 to reset.

Figures 4A, 4B:
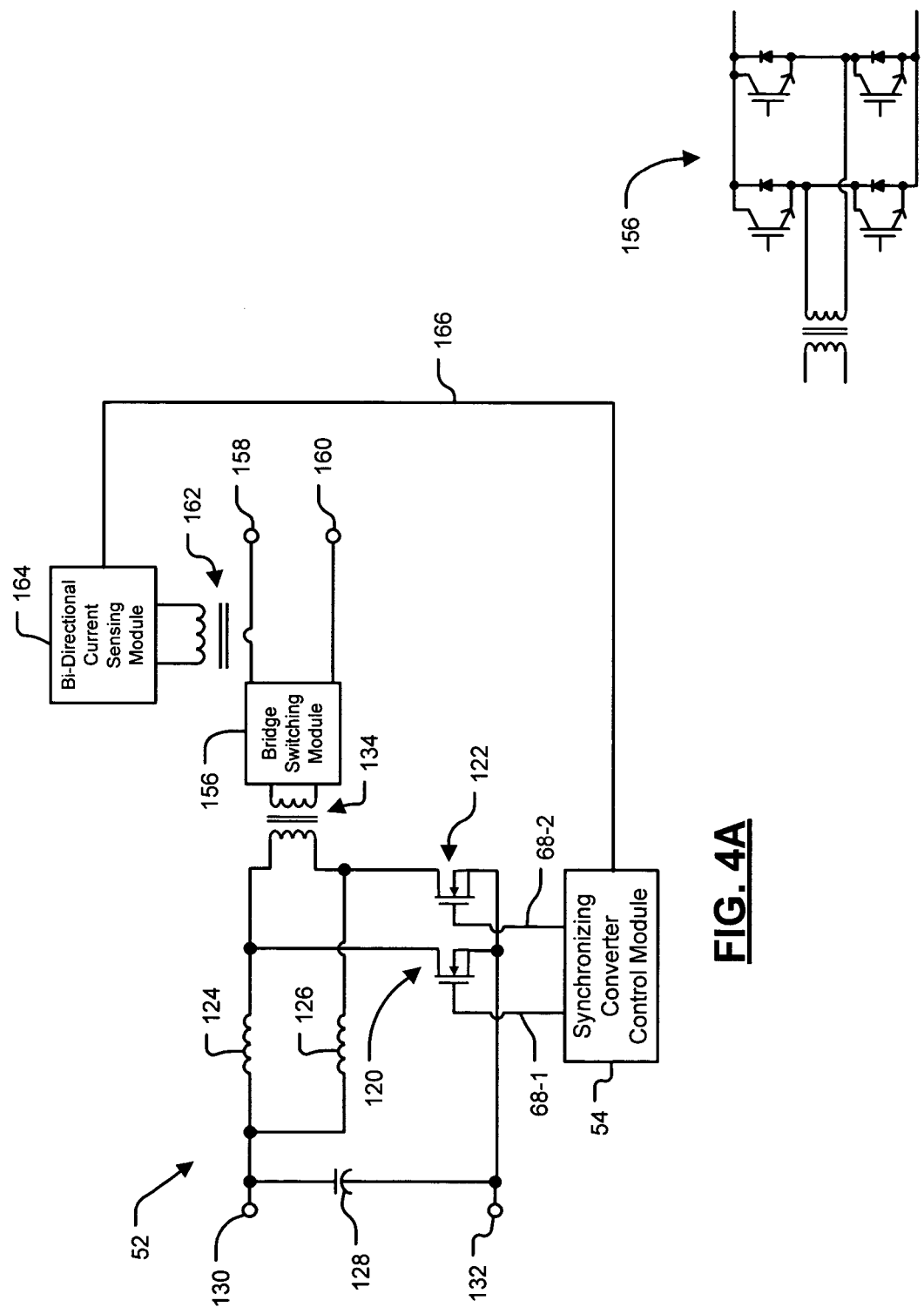
FIG. 4A is a circuit schematic of an exemplary bridge switching module according to the prior art.

Referring now to FIG. 4A, an exemplary bi-directional converter circuit 52 is shown in more detail. Those skilled in the art can appreciate that any suitable bi-directional converter circuit may be used with the bi-directional current sensing circuit 50 as shown in FIG. 3. The converter circuit 52 includes first and second transistors 120 and 122, first and second inductors 124 and 126, and an input capacitor 128. The converter circuit 52 receives an input voltage Vin across input terminals 130 and 132. The input voltage Vin causes a current through the first inductor 124 to rise and/or fall according to the input voltage Vin, the inductance characteristics of the first inductor 124, and ON or OFF statuses of the first and second transistors 120 and 122. Current flows through a power transformer 134 according to the ON or OFF statuses of the first and second transistors 120 and 122.

Figure 5:
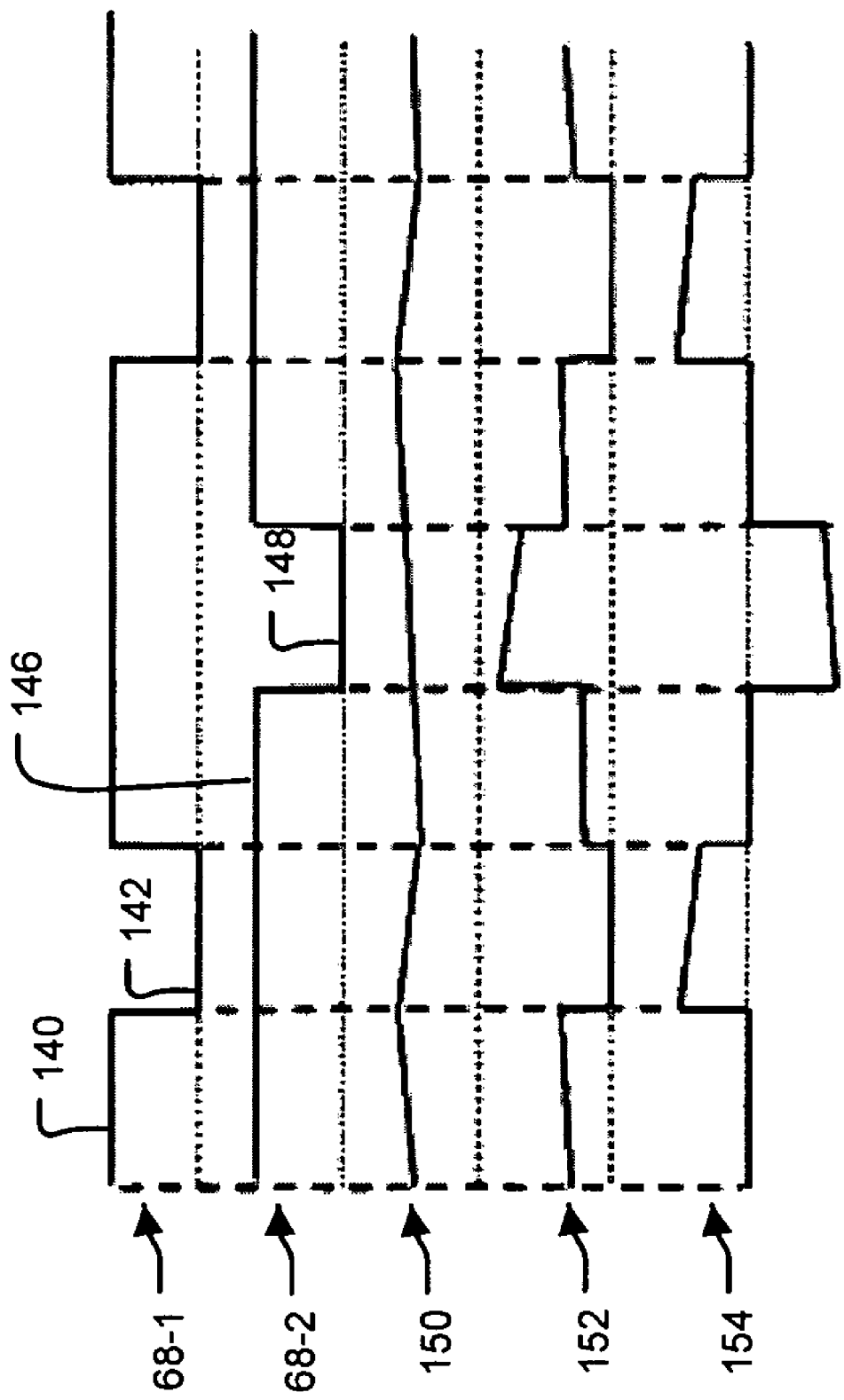
FIG. 5 illustrates operating waveforms of a converter circuit according to the present invention.

Referring now to FIGS. 4A and 5, the operation of the first and second transistors 120 and 122 determines the current flow through the first inductor 124 and the power transformer 134. The converter control module 54 outputs first and second switching control signals 68-1 and 68-2 that are connected to the first and second transistors 120 and 122, respectively. The first and second transistors 120 and 122 turn ON and OFF according to the first and second switching control signals 68-1 and 68-2.

The first transistor 120 is ON when the first switching control signal 68-1 is high as indicated at 140. Conversely, the first transistor 120 is OFF when the first switching control signal 68-1 is low as indicated at 142. The second transistor 122 is ON when the second switching control signal 68-2 is high as indicated at 146. The second transistor 122 is OFF when the second switching control signal 68-2 is low as indicated at 148. In this manner, the first and second switching control signals 68-1 and 68-2 turn the first and second transistors 120 and 1220N and OFF.

An inductor current signal 150 indicates a current flowing through the first inductor 124. A first transistor current signal 152 indicates a current flowing through the first transistor 120. A transformer current signal 154 indicates a current flowing through the power transformer 134. When at least the first transistor 120 is ON, current through the first inductor 124 rises according to the inductor current signal 150. When the first transistor 120 is OFF, current through the first inductor 126 decreases. As shown, current flows through the power transformer 134 in a first direction when the first transistor 120 is OFF and the second transistor 122 is ON. Current flows through the power transformer 134 in a second direction when the first transistor 120 is ON and the second transistor 122 is OFF.

In this manner, the converter control module 54 controls the current flow through the power transformer 134 with the switching control signals 68. A bridge switching module 156 (or other known rectifying device) receives current from the power transformer 134 and generates an output voltage across output nodes 158 and 160. An exemplary bridge switching module 156 is shown in more detail in FIG. 4B. A current transformer 162 as described in FIG. 3 is connected between the bridge switching module 156 and the output node 158. In this manner, current flowing through the current transformer 162 is indicative of current flowing through a load connected across the output nodes 158 and 160. A bi-directional current sensing module 164 communicates with the current transformer 162 as described in FIG. 3. The converter control module 54 synchronizes switching of the current sensing module 164 and the transistors 120 and 122 with a resetting signal 166.

Figure 6:
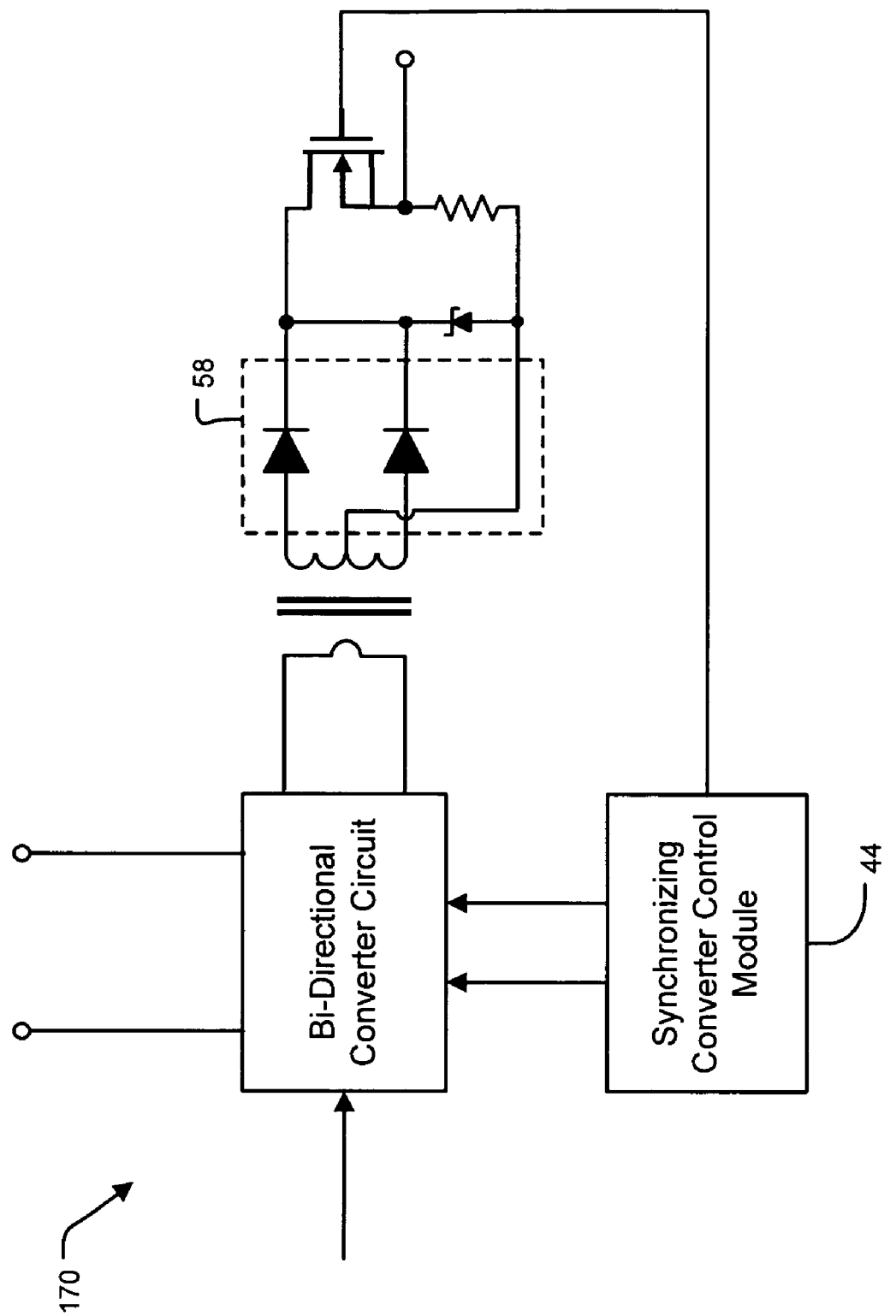
FIG. 6 is a functional block diagram of a bi-directional converter current sensing circuit in a half-bridge implementation according to the present invention.
Figure 7:
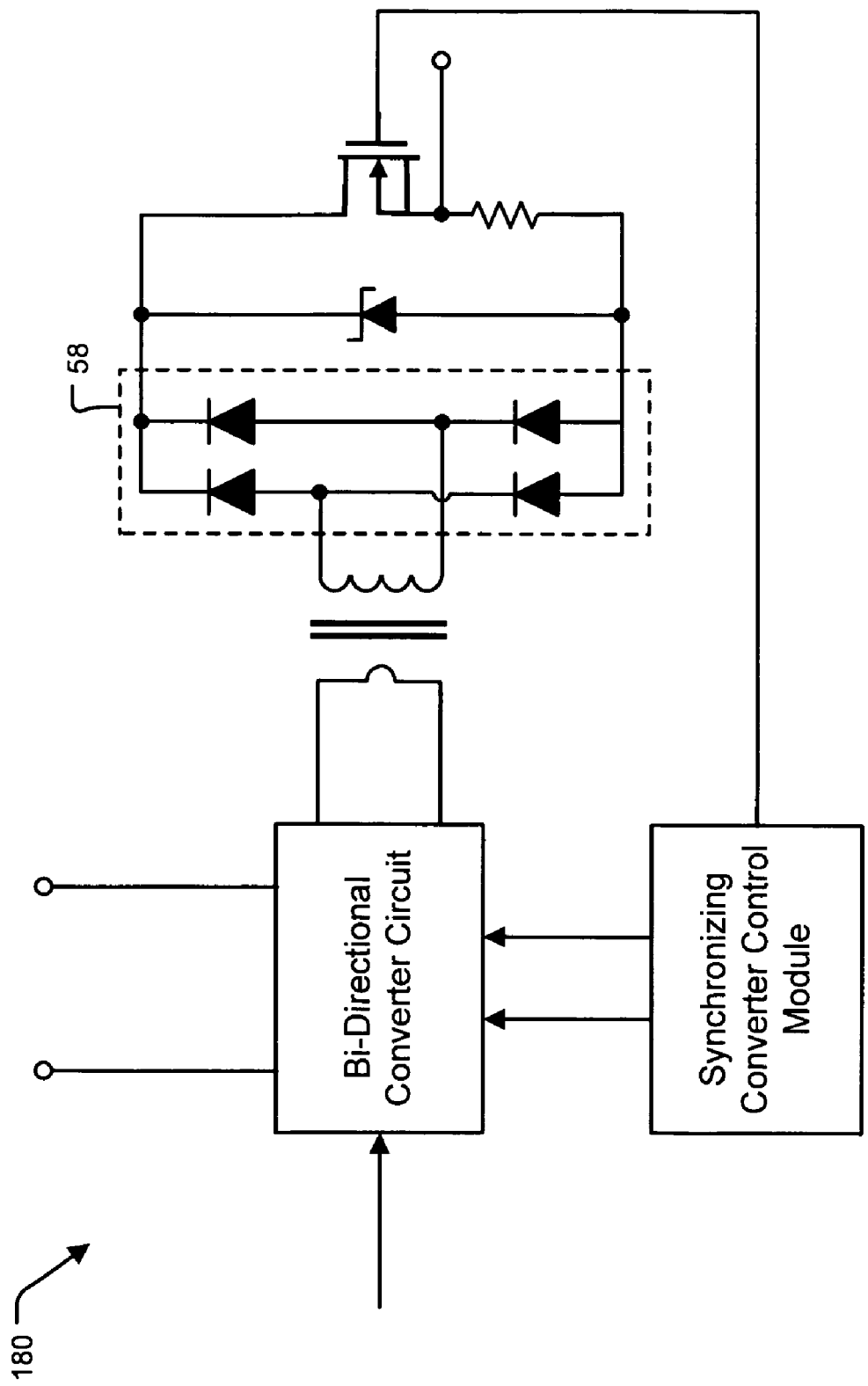
FIG. 7 is a functional block diagram of a bi-directional converter current sensing circuit in a full-bridge implementation according to the present invention.

Referring now to FIG. 6, a bi-directional current sensing circuit 170 is shown with the rectifier module 58 in a half-bridge implementation. Referring now to FIG. 7, a bi-directional current sensing circuit 180 is shown with the rectifier module 58 in a full-bridge implementation.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A current sensing circuit that determines an output current of a bi-directional converter circuit comprising:
   a current transformer that receives a first current signal and that outputs a second current signal, wherein the first current signal is indicative of the output current and flows through the current transformer in one of a first direction and/or a second direction, and the second current signal is indicative of the first current signal;
   a current sensing module that receives the second current signal and has a first state and a second state, wherein the current sensing module includes a semiconductor switch, the current sensing module is in the first state when the semiconductor switch is in an ON state, and the current sensing module is in the second state when the semiconductor switch is in an OFF state;
   a converter control module that simultaneously transitions the first current signal from the first direction to the second direction and transitions the current sensing module from the first state to the second state, and that transitions the current sensing module to the first state after a resetting period.

2. The current sensing circuit of claim 1 further comprising a sense resistor, wherein current flows through the sense resistor when the current sensing module is in the first state and current does not flow through the sense resistor when the current sensing module is in the second state.

3. The current sensing circuit of claim 1 wherein the current sensing module includes a resetting device that resets the current transformer when the current sensing module is in the second state.

4. The current sensing circuit of claim 1 further comprising a rectifier module that receives that second current signal from the current transformer and outputs a rectified current signal, wherein the current sensing module receives the rectified current signal.

5. The current sensing circuit of claim 1 wherein the converter control module generates a resetting signal, the semiconductor switch receives the resetting signal, and the converter control module transitions the semiconductor switch between the ON state and the OFF state with the resetting signal.

6. A current sensing circuit that determines an output current of a bi-directional converter circuit comprising:
   a current transformer that receives a first current signal and that outputs a second current signal, wherein the first current signal is indicative of the output current and flows in one of a first direction and/or a second direction, and the second current signal is indicative of the first current signal;
   a current sensing module that receives the second current signal and has a first state and a second state;
   a converter control module that simultaneously transitions the first current signal from the first direction to the second direction and transitions the current sensing module from the first state to the second state, and that transitions the current sensing module to the first state after a resetting period,
   wherein the current sensing module includes a semiconductor switch that has an ON state and an OFF state, wherein the current sensing module is in the first state when the semiconductor switch is in the ON state and is in the second state when the semiconductor switch is in the OFF state,
   wherein the converter control module generates a resetting signal, the semiconductor switch receives the resetting signal, and the converter control module transitions the semiconductor switch between the ON state and the OFF state with the resetting signal, and
   wherein the converter control module transitions the semiconductor switch to the OFF state when the converter control module transitions the first current signal from the first direction to the second direction, that transitions the semiconductor switch to the OFF state when the converter control module transitions the first current signal from the second direction to the first direction, and that transitions the semiconductor switch to the ON state after the resetting period.

7. The current sensing circuit of claim 1 wherein the resetting period is less than a current transformer reset period.

8. The current sensing circuit of claim 4 wherein the rectifier module is one of a half-bridge rectifier and a full bridge rectifier.

9. The current sensing circuit of claim 1 wherein the converter control module is a pulse width modulation (PWM) control module.

10. A bi-directional converter circuit that comprises the current sensing circuit of claim 1.

11. The bi-directional converter circuit of claim 10 wherein the bi-directional converter circuit is a DC/DC boost converter circuit.

12. The current sensing circuit of claim 3 wherein the resetting device is a resetting diode.

13. A bi-directional converter circuit comprising:
a converter circuit that generates a bi-directional current;
a current transformer that receives a first current signal that is indicative of the bi-directional current and that outputs a second current signal, wherein the first current signal flows through the current transformer in one of a first direction and/or a second direction, and the second current signal is indicative of the first current signal;
a rectifier module that receives the second current signal and outputs a rectified current signal;
a current sensing module that receives the rectified current signal and that includes a semiconductor switch that has a first state and a second state;
a converter control module that simultaneously transitions the first current signal from the first direction to the second direction and transitions the semiconductor switch from the first state to the second state, and that transitions the current sensing module from the second state to the first state after a resetting period.

14. The bi-directional converter circuit of claim 13 wherein the semiconductor switch is ON in the first state and is OFF in the second state.

15. The bi-directional converter circuit of claim 13 further comprising a sense resistor, wherein current flows through the sense resistor when the semiconductor switch is in the first state and current does not flow through the sense resistor when the semiconductor switch is in the second state.

16. The bi-directional converter circuit of claim 13 wherein the current sensing module includes a resetting device that resets the current transformer when the semiconductor switch is in the second state.

17. The current sensing circuit of claim 13 wherein the resetting period is less than a current transformer reset period.

18. The current sensing circuit of claim 13 wherein the converter control module is a pulse width modulation (PWM) control module.

* * * * *

UNITED STATES PATENT AND TRADEMARK OFFICE
CERTIFICATE OF CORRECTION

PATENT NO.        : 7,643,321 B2                                          Page 1 of 1
APPLICATION NO.  : 11/236858
DATED             : January 5, 2010
INVENTOR(S)       : Keming Chen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 741 days.

Signed and Sealed this

Sixteenth Day of November, 2010

David J. Kappos
*Director of the United States Patent and Trademark Office*